United States Patent
Morita et al.

(10) Patent No.: US 7,386,055 B2
(45) Date of Patent: Jun. 10, 2008

(54) MULTI-CARRIER TRANSMISSION/RECEPTION APPARATUS

(75) Inventors: Minori Morita, Kanazawa (JP); Atsushi Sumasu, Yokosuka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 892 days.

(21) Appl. No.: 10/468,791

(22) PCT Filed: Dec. 3, 2002

(86) PCT No.: PCT/JP02/12618

§ 371 (c)(1), (2), (4) Date: Aug. 22, 2003

(87) PCT Pub. No.: WO03/049344

PCT Pub. Date: Jun. 12, 2003

(65) Prior Publication Data

US 2004/0085946 A1 May 6, 2004

(30) Foreign Application Priority Data

Dec. 7, 2001 (JP) .............................. 2001-375083

(51) Int. Cl.
*H04K 1/10* (2006.01)
(52) U.S. Cl. .................................. 375/260
(58) Field of Classification Search ........... 375/260, 375/130, 131, 140, 141, 145, 146, 147, 149, 375/354, 357, 369, 372, 373, 374; 370/395.62, 370/507; 455/265; 702/89; 713/375, 400
See application file for complete search history.

(56) References Cited

U.S. PATENT DOCUMENTS 7,154,973 B2 * 12/2006 Hanada et al. .............. 375/354
2001/0040882 A1 11/2001 Ichiyoshi

FOREIGN PATENT DOCUMENTS

| EP | 1028552 | 8/2000 |
| JP | 2000 138657 | 5/2000 |
| JP | 2001 320342 | 11/2001 |

OTHER PUBLICATIONS

Hanada et al. Three-Step Cell Search Algorithm for Broadband Multi-carrier CDMA Packet Wireless Access, IEEE, Oct. 2001, G-32-G-37.*

(Continued)

*Primary Examiner*—Sam K Ahn
(74) *Attorney, Agent, or Firm*—Dickinson Wright, PLLC

(57) ABSTRACT

A multicarrier radio communication technology that enables radio resources to be used effectively, interference-to be suppressed, and a cell search to be performed at high speed, in a multicarrier CDMA system. In this technology, a secondary synchronization code (S-SCH signal) for identifying the group of scrambling codes divided into groups beforehand is frequency multiplexed in a plurality of subcarriers. A secondary synchronization code is coded in the time direction. Subcarriers in which a secondary synchronization code is multiplexed are mutually separated and equally spaced. The number of subcarriers in which a secondary synchronization code is multiplexed can be set to a small value with respect to the total number of subcarriers. A secondary synchronization code is an orthogonal code. On the receiving side, a cell search is carried out using such a frequency multiplexed type S-SCH.

10 Claims, 9 Drawing Sheets

OTHER PUBLICATIONS

International Search Report dated Mar. 4, 2003.

Y. Hanada, et al., "Performance of 3-step Fast Cell Search Algorithm Considering Pilot Channel Structure in Broadband Multi-carrier CDMA Wireless Access", IEEE, Mar. 7, 2001, pp. 783-784, with partial English translation.

Y. Hanada, et al., "3-Step Fast Cell Search Method and its Performance for Broadband Multi-carrier CDMA Wireless Access", IEEE, vol. 100, No. 435, Nov. 17, 2000, pp. 49-55, with English Abstract.

Y. Hanada, et al., "3-Step Cell Search Performance using frequency multiplexed SCH for Broadband Multi-carrier CDMA Wireless Access", IEEE, Jul. 2001, pp. 73-78, with English Abstract.

3GPP TS 25.214 V3.8.0 (Sep. 2001), "Physical Layer Procedures (FDD)", 2001, pp. 1-50.

* cited by examiner

MULTI-CARRIER TRANSMISSION/RECEPTION APPARATUS

TECHNICAL FIELD

The present invention relates to a multicarrier transmitting/receiving apparatus, multicarrier radio communication method, and multicarrier radio communication program.

BACKGROUND ART

Nowadays, in radio communications, and especially in mobile communications, various kinds of information such as images and data are transmitted as well as voice. Henceforth, demand for the transmission of various kinds of content is expected to continue to grow, further increasing the necessity of highly reliable, high-speed, large-volume transmission. However, when high-speed transmission is carried out in mobile communications, the effect of delayed waves due to multipath propagation cannot be ignored, and transmission characteristics degrade due to frequency selective fading.

Multicarrier modulation methods such as OFDM (Orthogonal Frequency Division Multiplexing) are attracting attention as one kind of technology for coping with frequency selective fading. A multicarrier modulation method is a technology that achieves high-speed transmission by transmitting data using a plurality of carriers (subcarriers) whose transmission speed is suppressed to a level at which frequency selective fading does not occur. With the OFDM method, the subcarriers on which data is placed are mutually orthogonal, making this the multicarrier modulation method offering the highest spectral efficiency. Moreover, the OFDM method can be implemented with a comparatively simple hardware configuration. For these reasons, OFDM is an object of particular attention.

Spread spectrum methods such as CDMA (Code Division Multiple Access) are another example of technology for coping with frequency selective fading. CDMA improves interference tolerance by spreading each user's information directly on the frequency axis with a user-specific spreading code to obtain spreading gain, and is already in use in mobile communications.

Recently, a method combining OFDM and CDMA (known as MC (multicarrier)-CDMA or OFDM-CDMA, but hereinafter referred to as "multicarrier CDMA") has been attracting particular attention as an access method for implementing faster transmission. Multicarrier CDMA methods are broadly divided into a time domain spreading type, in which spread chips are placed on the time axis in each subcarrier, and a frequency domain spreading type in which spread chips are placed on the frequency axis at each time. In the former case, a path diversity effect is obtained but a frequency diversity effect is not obtained, whereas in the latter case, conversely, a frequency diversity effect is obtained but a path diversity effect is not obtained.

An example of a cell search method with this kind of multicarrier CDMA is described in "3-Step Cell Search Performance using frequency-multiplexed SCH for Broadband Multi-carrier CDMA Wireless Access" (Hanada, Atarashi, Higuchi, Sawahashi), TECHNICAL REPORT OF IEICE NS2001-90, RCS2001-91 (2001-07), pp. 73-78.

Here, in a broadband radio access method using multicarrier CDMA in the downlink, FFT (Fast Fourier Transform) window timing is first detected by means of a peak in the correlation values arising from a guard interval section and effective symbol section (first stage: FFT window timing detection). Next, FFT processing is performed using this FFT window timing, the correlation between the subcarrier component in which a Synchronization Channel (SCH) is multiplexed and an SCH replica is integrated over the length of one frame for each subcarrier, this correlation detected value is averaged by power addition in the frequency direction and time direction, and the timing at which the maximum correlation output after averaging is detected is detected as the frame timing (second stage: frame timing detection). Then, the correlation of each scrambling code is integrated in the time direction for each subcarrier using a Common Pilot Channel (CPICH) time-multiplexed at the detected frame timing, and a correlation value for each subcarrier is detected, in-phase addition is performed in the frequency direction, power addition is performed in the time direction, and a correlation value for each scrambling code is detected. The scrambling code for which the scrambling code correlation value is a maximum is detected, and the scrambling code is identified (third stage: scrambling code identification).

However, a problem with the above-described conventional cell search method is that, since the correlation value of the time-multiplexed common pilot channel and scrambling code is found for each scrambling code, the scrambling code at the time of this correlation value being a maximum is detected, and the scrambling code is identified, after frame synchronization is achieved, a cell search (achieving initial synchronization) takes time when there are a large number of scrambling codes. There is a further problem in that, even after initial synchronization, the same kind of processing as in the initial synchronization cell search must be carried out when another cell search is performed, which similarly takes time.

DISCLOSURE OF INVENTION

It is an object of the present invention to provide a multicarrier transmitting/receiving apparatus, multicarrier radio communication method, and multicarrier radio communication program that enable radio resources to be used effectively, interference to be suppressed, and a cell search to be performed at high speed, in a multicarrier CDMA system.

The present inventors reached the present invention by directing attention to the "cell search procedure" disclosed in 3GPP standard "TS25.214 Physical Layer Procedures (FDD)" for solving a problem (the time taken for a cell search when there are a large number of scrambling codes) in the conventional cell search method when multicarrier CDMA is used as a downlink radio access method, and considered how this could be applied to a multicarrier CDMA system.

The gist of the present invention is that a scrambling code group identification code for identifying the group of scrambling codes divided into groups beforehand is placed on a frequency-that is, a scrambling code group identification code is frequency multiplexed in a multicarrier signal.

According to one embodiment of the present invention, a multicarrier transmitting apparatus performs radio communication by combining multicarrier modulation with CDMA, and has a placement section that places on a frequency a scrambling code group identification code for identifying the group of scrambling codes divided into groups beforehand, and a transmission section that transmits a multicarrier signal in which the scrambling code group identification code has been placed on a frequency by the placement section.

According to another embodiment of the present invention, a multicarrier receiving apparatus performs radio communication by combining multicarrier modulation with CDMA, and has a reception section that receives a multicarrier signal in which a scrambling code group identification code for identifying the group of scrambling codes divided into groups beforehand has been placed on a frequency, an extraction section that extracts the scrambling code group identification code from a multicarrier signal received by the reception section, a first identification section that identifies a scrambling code group using the scrambling code group identification code extracted by the extraction section, and a second identification section that identifies a scrambling code used by the received multicarrier signal based on the scrambling code group identified by the first identification section.

According to yet another embodiment of the present invention, a multicarrier radio communication method is a multicarrier radio communication method in a multicarrier transmitting apparatus that performs radio communication by combining multicarrier modulation with CDMA, and this multicarrier radio communication method has a placement step of placing on a frequency a scrambling code group identification code for identifying the group of scrambling codes divided into groups beforehand, and a transmission step of transmitting a multicarrier signal in which the scrambling code group identification code has been placed on a frequency in the placement step.

According to yet another embodiment of the present invention, a multicarrier radio communication method is a multicarrier radio communication method in a multicarrier receiving apparatus that performs radio communication by combining multicarrier modulation with CDMA, and this multicarrier radio communication method has a reception step of receiving a multicarrier signal in which a scrambling code group identification code for identifying the group of scrambling codes divided into groups beforehand has been placed on a frequency, an extraction step of extracting the scrambling code group identification code from a multicarrier signal received in the reception step, a first identification step of identifying a scrambling code group using the scrambling code group identification code extracted in the extraction step, and a second identification step of identifying a scrambling code used by the received multicarrier signal based on the scrambling code group identified in the first identification step.

According to yet another embodiment of the present invention, a multicarrier radio communication program is a multicarrier radio communication program in a multicarrier transmitting apparatus that performs radio communication by combining multicarrier modulation with CDMA, and this multicarrier radio communication program causes a computer to execute a placement step of placing on a frequency a scrambling code group identification code for identifying the group of scrambling codes divided into groups beforehand, and a transmission step of transmitting a multicarrier signal in which the scrambling code group identification code has been placed on a frequency in the placement step.

According to yet another embodiment of the present invention, a multicarrier radio communication program is a multicarrier radio communication program in a multicarrier receiving apparatus that performs radio communication by combining multicarrier modulation with CDMA, and this multicarrier radio communication program causes a computer to execute a reception step of receiving a multicarrier signal in which a scrambling code group identification code for identifying the group of scrambling codes divided into groups beforehand has been placed on a frequency, an extraction step of extracting the scrambling code group identification code from a multicarrier signal received in the reception step, a first identification step of identifying a scrambling code group using the scrambling code group identification code extracted in the extraction step, and a second identification step of identifying a scrambling code used by the received multicarrier signal based on the scrambling code group identified in the first identification step.

BEST MODE FOR CARRYING OUT THE INVENTION

With reference now to the accompanying drawings, an embodiment of the present invention will be explained in detail below. In the embodiment described below, it is assumed that, for example, the Secondary Synchronization Code (SSC) or Secondary Synchronization Channel (S-SCH) in the "cell search procedure" disclosed in 3GPP standard "TS25.214 Physical Layer Procedures (FDD)" is used as a scrambling code group identification code.

Figure 1:
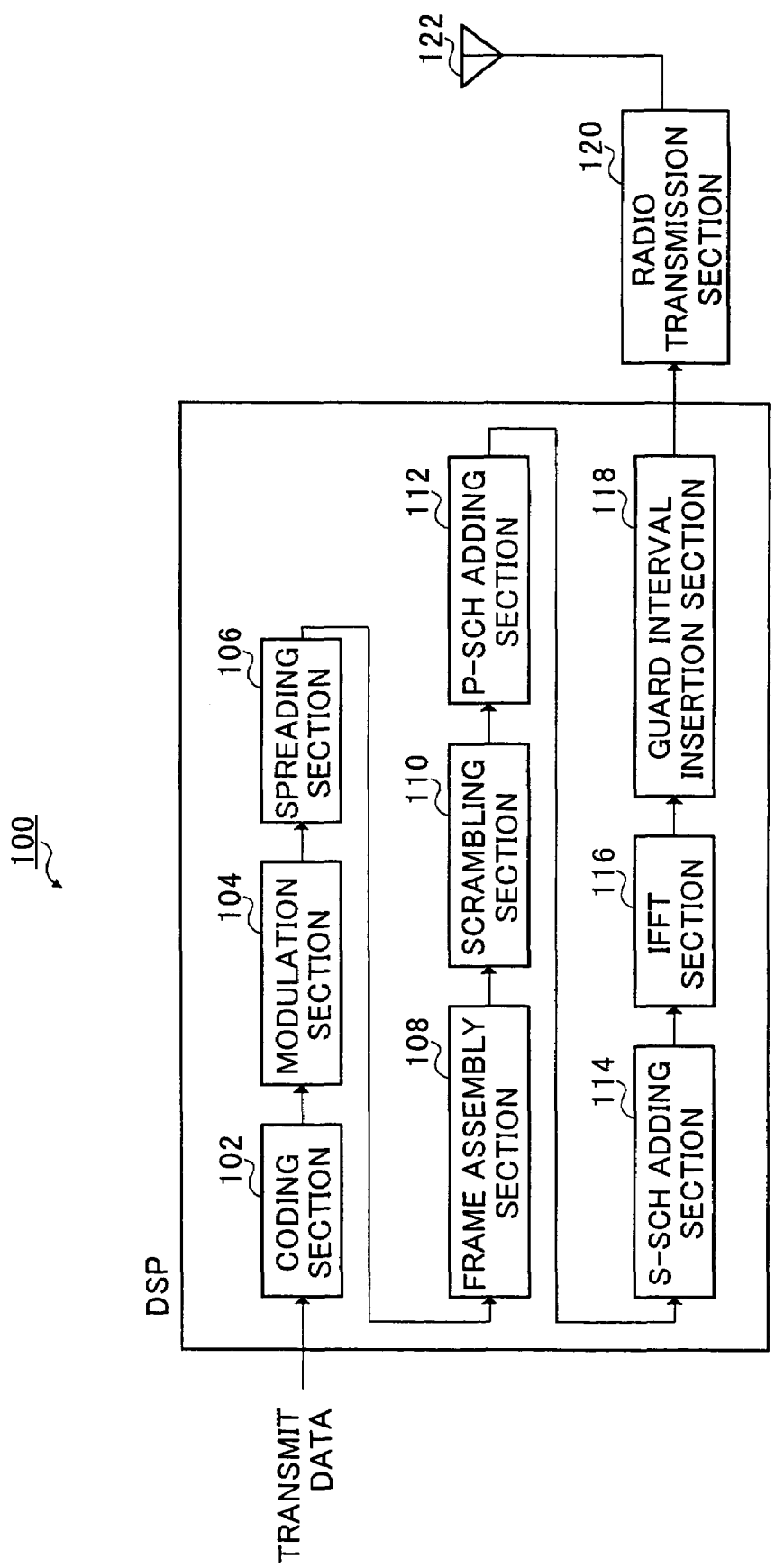
FIG. 1 is a block diagram showing the configuration of a multicarrier transmitting apparatus according to one embodiment of the present invention.

FIG. 1 is a block diagram showing the configuration of a multicarrier transmitting apparatus according to one embodiment of the present invention.

Multicarrier transmitting apparatus (hereinafter referred to simply as "transmitting apparatus") 100 shown in FIG. 1 uses multicarrier CDMA, and has a coding section 102, modulation section 104, spreading section 106, frame assembly section 108, scrambling section 110, Primary Synchronization Channel (P-SCH) adding section 112, Secondary Synchronization Channel (S-SCH) adding section 114, Inverse Fast Fourier Transform (IFFT) section 116, guard interval insertion section 118, radio transmission section 120, and antenna 122. This transmitting apparatus 100 is installed in a base station apparatus in a mobile communication system, for example.

A brief explanation will now be given of the multicarrier CDMA method.

With multicarrier CDMA, a signal is transmitted distributed among a plurality of (X) carriers (subcarriers). To be specific, a transmit signal is first spread in the frequency axis direction by means of a spreading code, and code-multiplexed. The code-multiplexed signal undergoes serial/parallel conversion to a number of parallel signals equivalent to the number of subcarriers.

In multicarrier CDMA, subcarriers are OFDM-modulated so as to become orthogonal signals. Parallel signals resulting from serial/parallel conversion are transmitted via IFFT processing. By means of IFFT processing, an OFDM signal can maintain a state in which signals are orthogonal between subcarriers. Here, signals being orthogonal means that the spectrum of the signal of a particular subcarrier has no influence on signals of other subcarriers. When OFDM modulation is carried out, guard intervals are inserted in OFDM symbols. Guard interval insertion enables orthogonality to be maintained between subcarriers when only a delayed wave shorter than the guard interval length is present.

Next, the operation of transmitting apparatus 100 with the above configuration will be described.

Transmitting apparatus 100 first codes transmit data in coding section 102, then modulates the coded transmit data in modulation section 104, and spreads the modulated transmit data in spreading section 106 using a unique spreading code. The spread transmit data is divided into chip units, and output to frame assembly section 108.

In frame assembly section 108, the spread transmit data is placed in a predetermined location on the frequency axis and time axis (frame assembly). The assembled frame is output to scrambling section 110.

In scrambling section 110, scrambling is applied to the entire assembled frame using a scrambling code for identifying the cell (or sector). The scrambled frame is output to P-SCH adding section 112.

In P-SCH adding section 112, a Primary Synchronization Code (PSC)-that is, a Primary Synchronization Channel (P-SCH) signal-for achieving frame synchronization is added to the scrambled frame. For example, the primary synchronization code may be placed on a plurality of frequencies consecutively in the time direction (that is, frequency multiplexed) (see FIG. 2 and FIG. 3 described later herein). A frame to which a primary synchronization code has been added is output to S-SCH adding section 114.

In S-SCH adding section 114, a Secondary Synchronization Code (SSC)-that is, a Secondary Synchronization Channel (S-SCH) signal-for identifying the scrambling code group is added to the frame to which a primary synchronization code has been added. For example, the secondary synchronization code may be coded in the time direction and placed on a plurality of frequencies (that is, frequency multiplexed) (see FIG. 2 and FIG. 3 described later herein). At this stage, frame configuration of the signal to be transmitted is completed. Here, a scrambling code group is a group of scrambling codes divided into groups beforehand, and a unique code is assigned to each group. That is to say, scrambling codes are divided into a plurality of groups, and a group code is attached to each group. A frame to which a secondary synchronization code has been added is output to IFFT section 116.

In IFFT section 116, the frame (transmit signal) to which a secondary synchronization code has been added is subjected to inverse fast Fourier transform (IFFT) processing and converted from the frequency domain to the time domain, and is then output to guard interval insertion section 118.

In guard interval insertion section 118, a guard interval is inserted in the output signal from IFFT section 116 in order to improve characteristics with respect to delay. A guard interval is implemented by copying the end of an effective symbol section to the start of that symbol on a symbol-by-symbol basis.

After guard interval insertion, the signal undergoes radio processing such as up-conversion in radio transmission section 120, and is transmitted as a radio signal from antenna 122.

Excluding radio transmission section 120, the processing of sections 102 through 118 can be executed as baseband signal processing based on predetermined software (a predetermined program), using a microprocessor (computer) called a DSP (Digital Signal Processor).

Figure 2:
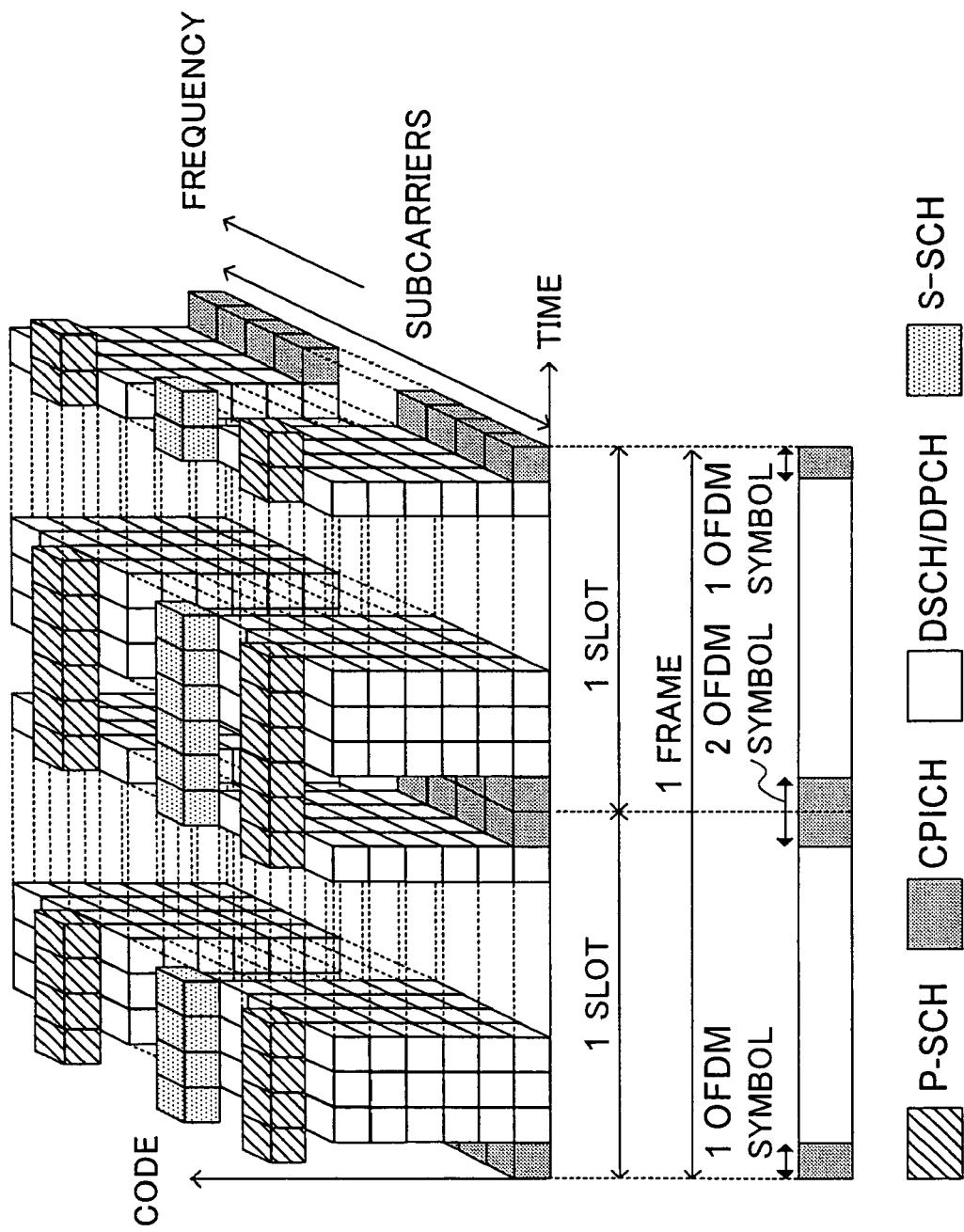
FIG. 2 is a drawing showing an example of the frame configuration of a signal transmitted from a multicarrier transmitting apparatus according to this embodiment.
Figure 3:
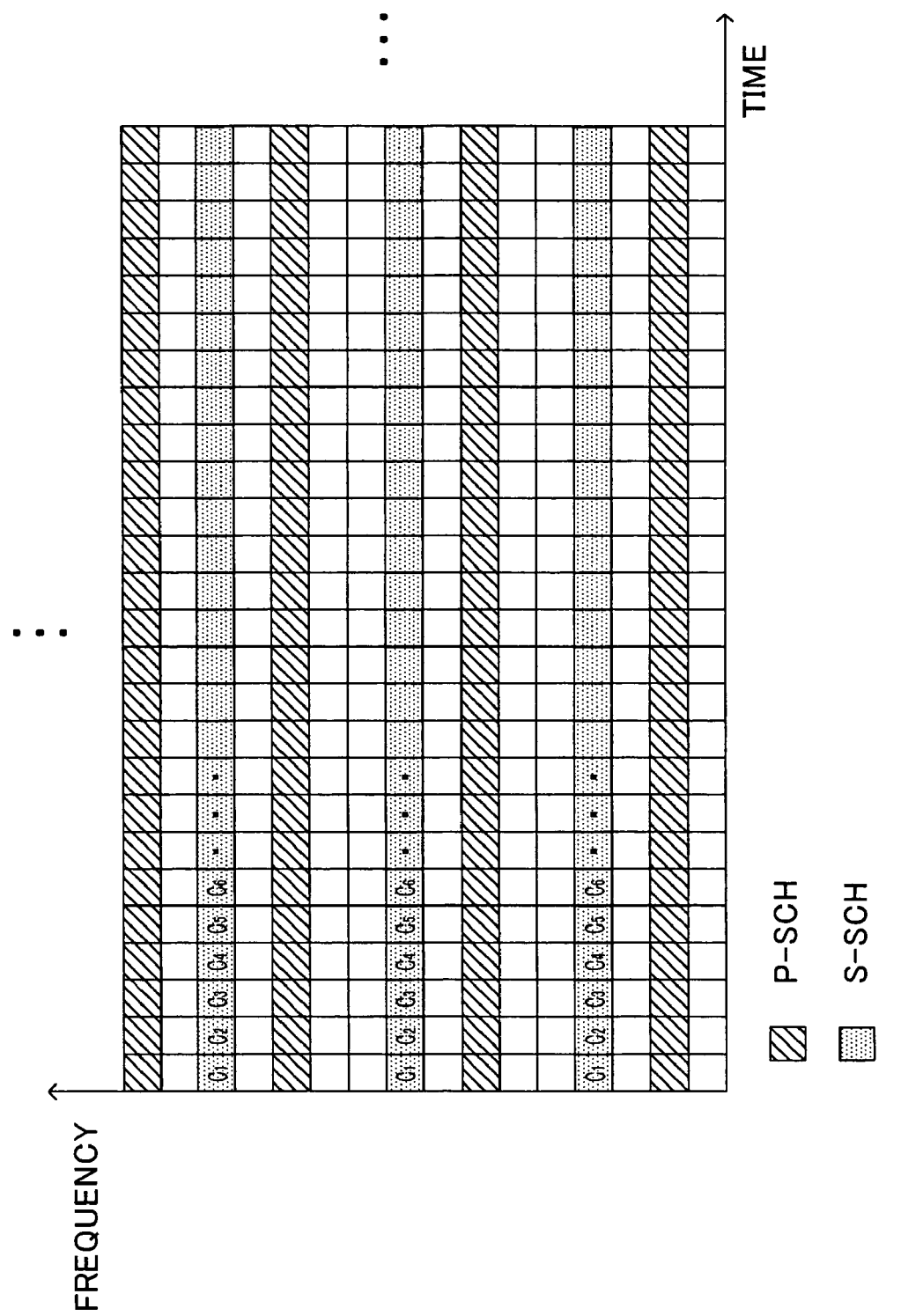
FIG. 3 is a drawing in which the three-dimensional frame configuration shown in FIG. 2 is viewed on a two-dimensional plane comprising a time axis and a frequency axis.

FIG. 2 is a drawing showing an example of the frame configuration of a signal transmitted from transmitting apparatus 100, and FIG. 3 is a drawing in which the three-dimensional frame configuration shown in FIG. 2 is viewed on a two-dimensional plane comprising a time axis and a frequency axis.

Here, as shown in FIG. 2 and FIG. 3, the primary synchronization code (P-SCH signal) and secondary synchronization code (S-SCH signal) are each frequency multiplexed in a plurality of subcarriers. More particularly, for the secondary synchronization code (S-SCH signal), coding sequence $C_1 C_2 C_3 C_4 C_5 C_6 \ldots$ coded in the time direction is frequency multiplexed in a plurality of subcarriers (see FIG. 3).

At this time, the subcarriers in which the primary synchronization code is multiplexed and the subcarriers in which the secondary synchronization code is multiplexed are separated from each other, preferably with equal spacing, in order to obtain a frequency diversity effect-that is, in order to reduce the influence of frequency selective fading.

Also, the number of subcarriers in which the primary synchronization code is multiplexed and the number of subcarriers in which the secondary synchronization code is multiplexed can be set to a small value with respect to the total number of subcarriers (X). By this means, the influence on other multiplex signals can be kept to a minimum.

Furthermore, as shown in FIG. 2, the common pilot channel (CPICH) is time multiplexed only at certain times to prevent degradation of radio channel resource allocation.

At this time, a scrambling code is applied in the frequency direction. In FIG. 2, "DSCH/DPCH" means "Downlink Shared Channel/Dedicated Physical Channel".

The secondary synchronization code should preferably be an orthogonal code. A Walsh-Hadamard code, for example, can be used as an orthogonal code. Making the secondary synchronization code an orthogonal code will minimize the likelihood of correlation with other secondary synchronization codes, enabling the accuracy of scrambling code group identification to be improved.

Figure 4:
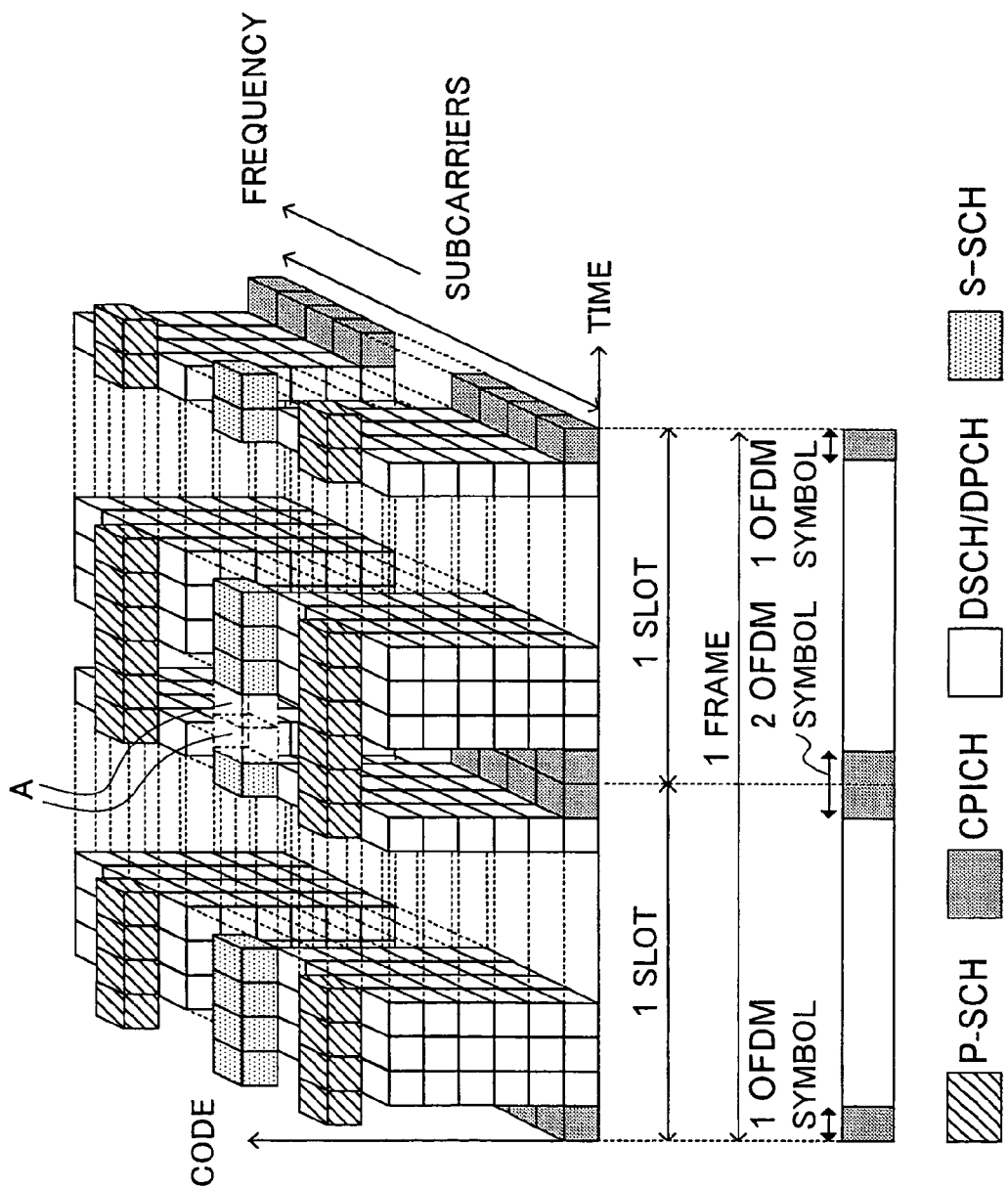
FIG. 4 is a drawing showing another example of the frame configuration of a signal transmitted from a multicarrier transmitting apparatus according to this embodiment.

Moreover, the length of the secondary synchronization code can be made shorter than the length of a time direction unit sequence, and the secondary synchronization code placed so that the proportion multiplexed with a predetermined other signal (for example, another multiplex signal such as the common pilot channel (CPICH)) is minimized-in other words, parts in which a predetermined other signal is multiplexed are avoided as far as possible. For example, as shown in FIG. 4, placement of the secondary synchronization code should be avoided in part A in which there is multiplexing with the common pilot channel (CPICH). By this means it is possible to suppress interference with the predetermined other signal.

Figure 5:
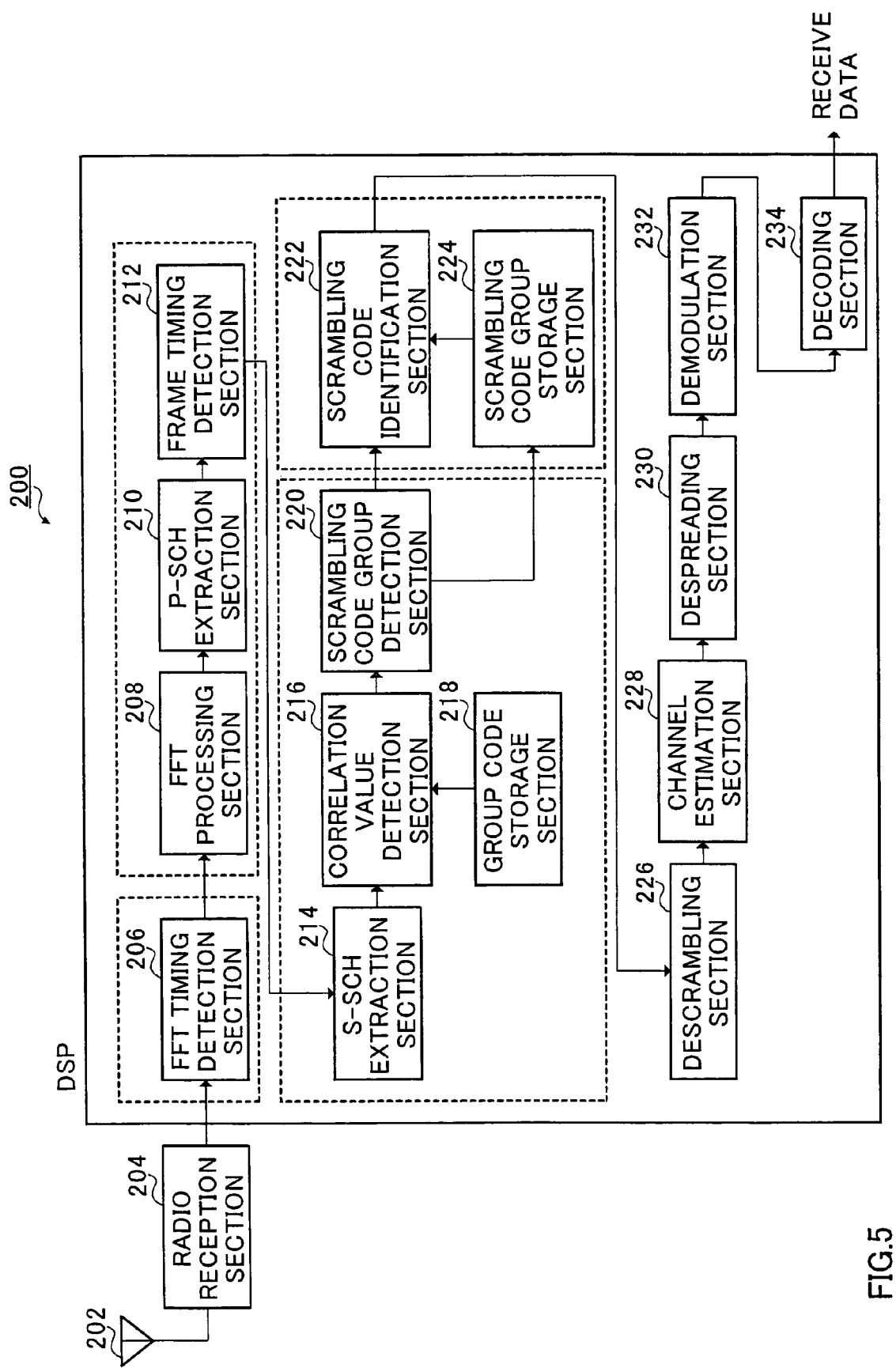
FIG. 5 is a block diagram showing the configuration of a multicarrier receiving apparatus according to one embodiment of the present invention.

FIG. 5 is a block diagram showing the configuration of a multicarrier receiving apparatus according to one embodiment of the present invention.

Multicarrier receiving apparatus (hereinafter referred to simply as "receiver") 200 shown in FIG. 5 performs radio communication with transmitting apparatus 100 using multicarrier CDMA, and has an antenna 202, radio reception section 204, FFT timing detection section 206, FFT processing section 208, P-SCH extraction section 210, frame timing detection section 212, S-SCH extraction section 214, correlation value detection section 216, group code storage section 218, scrambling code group detection section 220, scrambling code identification section 222, scrambling code group storage section 224, descrambling section 226, channel estimation section 228, despreading section 230, demodulation section 232, and decoding section 234. This receiver 200 is installed in a mobile station apparatus in a mobile communication system, for example.

Next, the operation of receiver 200 with the above configuration will be described.

Receiver 200 receives a signal transmitted as a radio signal from transmitting apparatus 100 (see FIG. 2 or FIG. 4) at antenna 202, and outputs this signal to radio reception section 204.

In radio reception section 204, predetermined radio processing such as down-conversion is carried out on the signal received by antenna 202. The output signal (baseband signal) from radio reception section 204 is output to FFT timing detection section 206.

In the sections from FFT timing detection section 206 through scrambling code group storage section 224, a cell search is performed using the frequency multiplexed type S-SCH shown in FIG. 2 and FIG. 3. Specifically, symbol synchronization is established as a first stage by means of FFT timing detection section 206; frame synchronization is established as a second stage by means of FFT processing section 208, P-SCH extraction section 210, and frame timing detection section 212; scrambling code identification (part 1)—that is, scrambling code group identification—is performed as a third stage by means of S-SCH extraction section 214, correlation value detection section 216, group code storage section 218, and scrambling code group detection section 220; and scrambling code identification (part 2) is performed as a fourth stage by means of scrambling code identification section 222 and scrambling code group storage section 224. Here, to summarize, scrambling code group identification is performed using a frequency multiplexed S-SCH signal, correlation values are detected with scrambling codes included in that group, and the scrambling code is identified.

Figure 6:
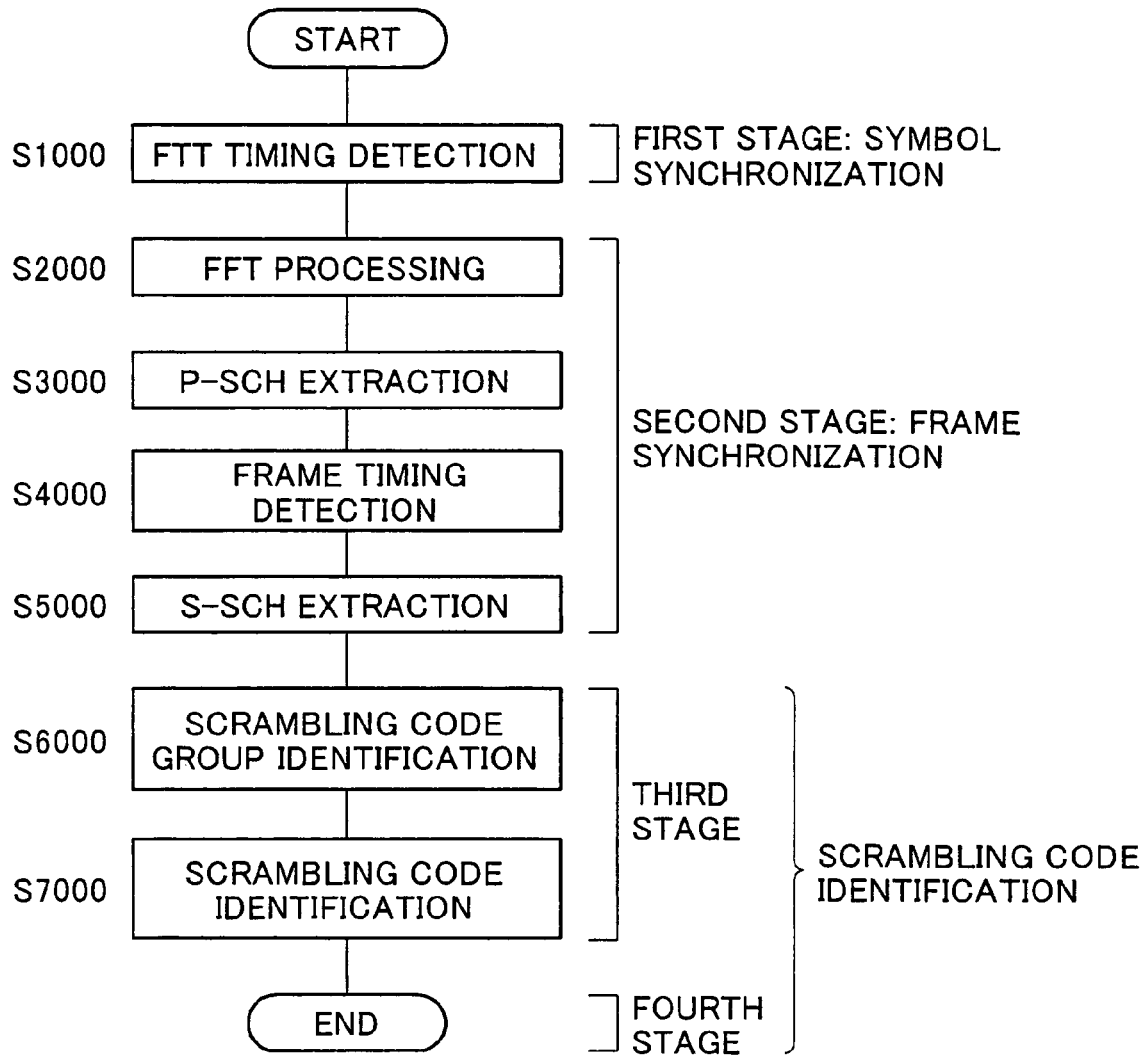
FIG. 6 is a flowchart showing a cell search algorithm according to one embodiment of the present invention.
Figure 7:
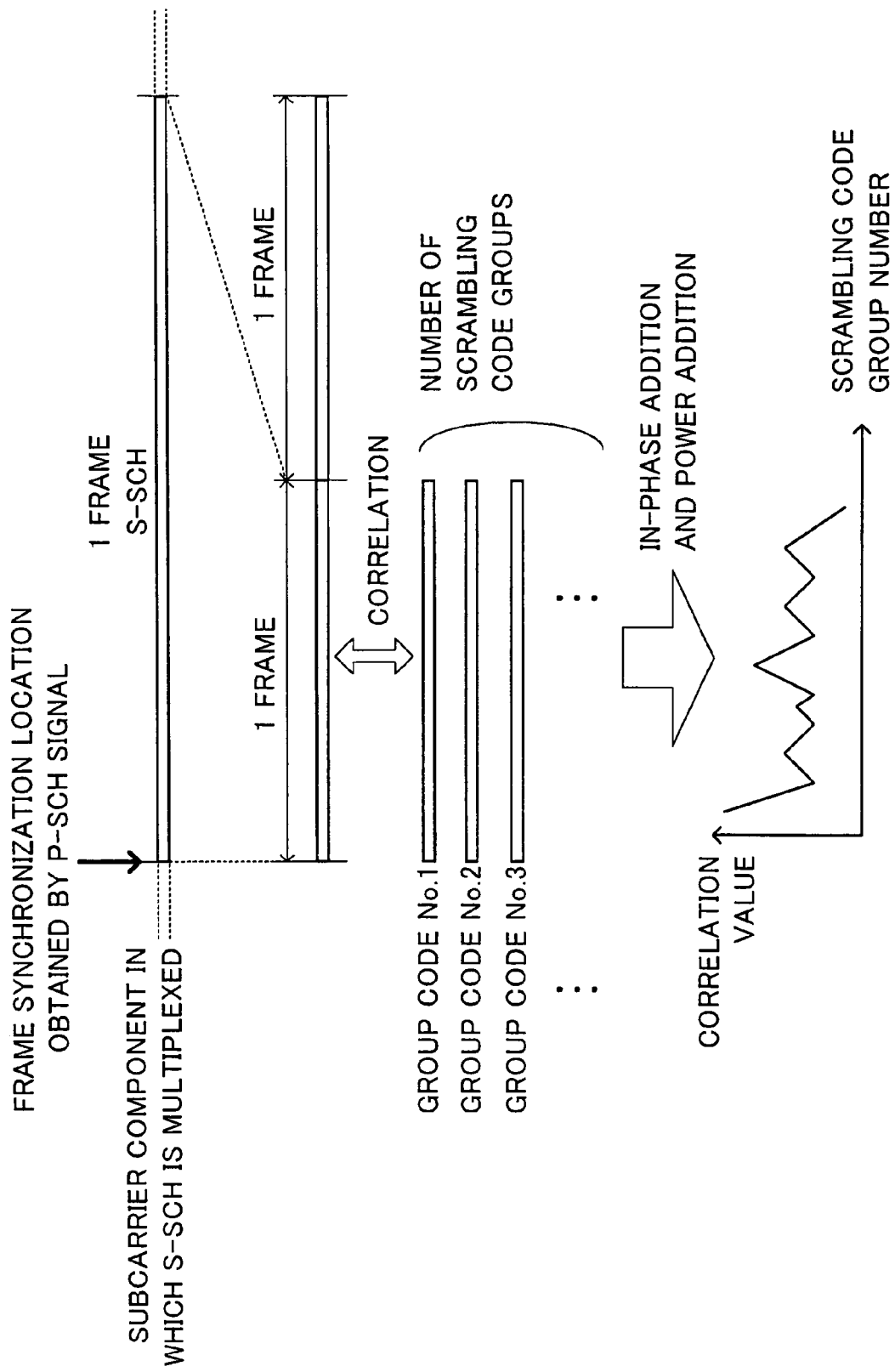
FIG. 7 is a drawing provided to explain the cell search algorithm shown in FIG. 6.

The processing in each stage is described below in specific terms, using FIG. 6 and FIG. 7. FIG. 6 is a flowchart showing a cell search algorithm according to this embodiment, and FIG. 7 is a drawing provided to explain the cell search algorithm shown in FIG. 6.

(1) First Stage: Symbol Synchronization

First, in step S1000, FFT timing detection section 206 detects correlation values of a received signal guard interval section and effective symbol section end part over the length of the effective symbol section, and takes the timing at which the maximum correlation value output is detected as the FFT window timing.

(2) Second Stage: Frame Synchronization

In step S2000, FFT processing section 208 performs FFT processing at the FFT window timing detected in the first stage.

In step S3000, P-SCH extraction section 210 extracts the subcarrier component in which P-SCH is frequency multiplexed using the result of the FFT processing in step S2000.

In step S4000, frame timing detection section 212 performs in-phase addition over the length of one frame of correlation with the frame synchronization signal replica for each subcarrier component extracted in step S3000, performs power addition in the frequency direction, and detects a correlation value. The timing at which the maximum correlation output is detected is taken as the frame timing.

(3) Third Stage: Scrambling Code Identification (part 1)

In step S5000, S-SCH extraction section 214 performs FFT processing at the FFT window timing detected in the first stage, and extracts the subcarrier component in which S-SCH is frequency multiplexed from the start position of the frame timing detected in the second stage (see FIG. 7).

In step S6000, correlation value detection section 216 and scrambling code group detection section 220 perform scrambling code group identification. That is to say, the mobile station apparatus (receiver 200) holds all the scrambling codes and scrambling code group codes beforehand as information. To be specific, all scrambling code group codes are stored in group code storage section 218, and all scrambling codes are stored, with their correspondence to a scrambling code group, in scrambling code group storage section 224. Correlation value detection section 216 creates replicas from the scrambling code group codes stored in group code storage section 218, finds the correlation for each subcarrier component extracted in step S5000, performs in-phase addition over the length of one frame, performs power addition in the frequency direction, and detects the correlation value of each group code (see FIG. 7). Scrambling code group detection section 220 then detects the maximum correlation output, detects the group code, and detects (identifies) the scrambling code group.

(4) Fourth Stage: Scrambling Code Identification (part 2)

In step S7000, scrambling code identification section 222 detects the correlation, using the time multiplexed common pilot channel (CPICH), for each scrambling code included in the scrambling code group detected in the third stage, and identifies the scrambling code for which the maximum correlation output is detected.

When scrambling code identification is completed by carrying out the above process, descrambling section 226 identifies the cell (or sector) using the identified scrambling code. A descrambled signal is output to channel estimation section 228.

Channel estimation section 228 performs channel estimation using the descrambled signal. Then, in order, despreading section 230 despreads the receive data using the same spreading code as used in transmission, demodulation section 232 demodulates the despread receive data, and decoding section 234 decodes the demodulated data, obtaining the desired receive data.

Excluding communication terminal 204, the processing of sections 206 through 234 can be executed as baseband signal processing based on predetermined software (a predetermined program), using a microprocessor (computer) called a DSP.

Thus, according to this embodiment, in a multicarrier CDMA system, a secondary synchronization code (S-SCH) is frequency multiplexed in a plurality of subcarriers (see FIG. 2) and a cell search is carried out using a frequency multiplexed type S-SCH, so that it is possible to shorten the scrambling code identification time by using a secondary synchronization code, and perform a cell search at high speed while making effective use of radio resources and suppressing interference, at the same time avoiding influencing other multiplex signals by setting an appropriate number of subcarriers for frequency multiplexing of the secondary synchronization code.

Figure 8:
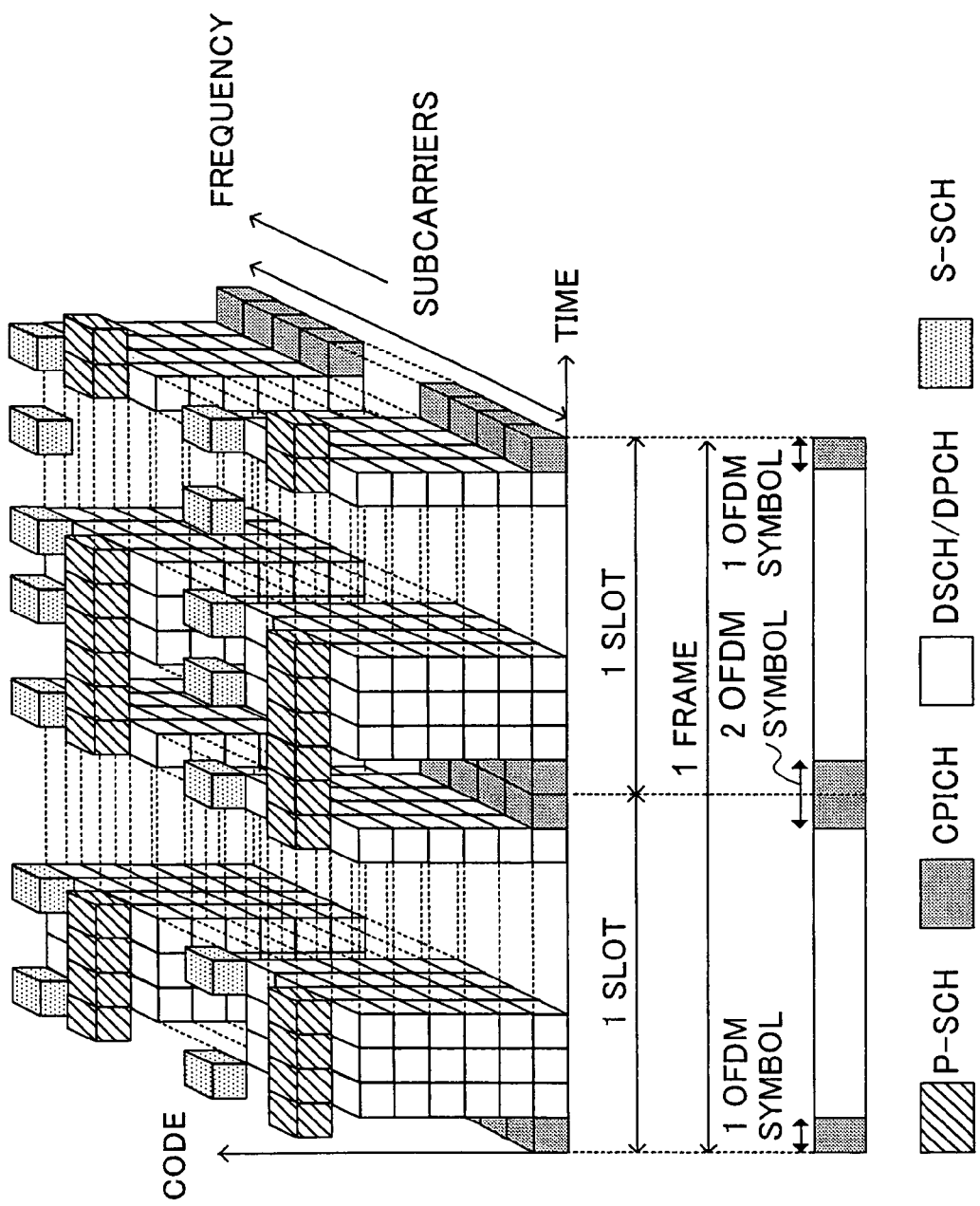
FIG. 8 is a drawing showing another example of the frame configuration of a signal transmitted from a multicarrier transmitting apparatus according to this embodiment.
Figure 9:
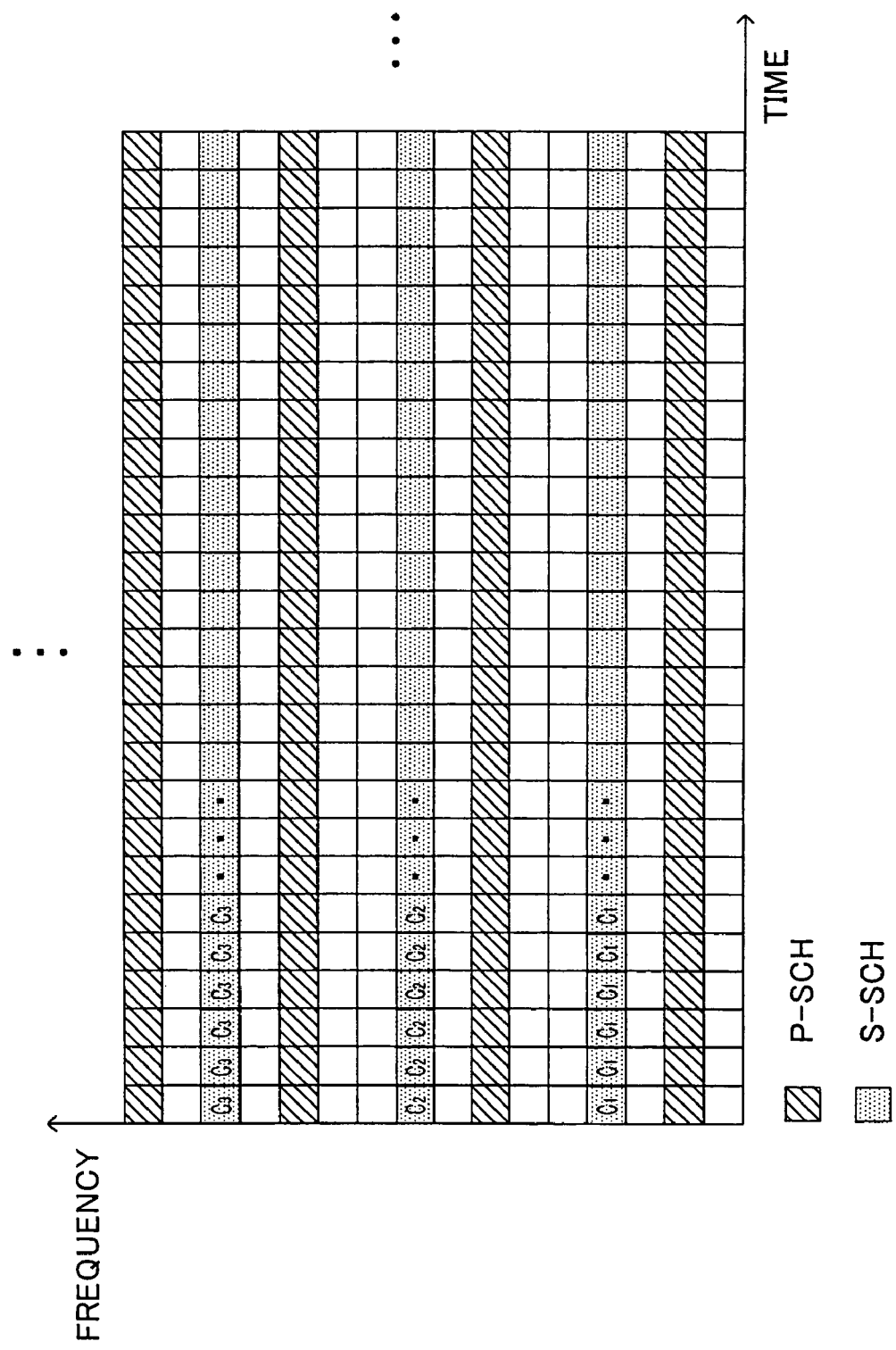
FIG. 9 is a drawing in which the three-dimensional frame configuration shown in FIG. 8 is viewed on a two-dimensional plane comprising a time axis and a frequency axis.

The secondary synchronization code multiplexing method is not limited to the example shown in FIG. 2 and FIG. 3. For example, it is also possible to use a configuration whereby a secondary synchronization code (S-SCH) comprising coding sequence $C_1 C_2 C_3$ . . . coded in the frequency direction is frequency multiplexed in a plurality of subcarriers, as shown in FIG. 8 and FIG. 9. In this case, also, the subcarriers in which the secondary synchronization code is multiplexed are separated from each other, and equally spaced. Also, the common pilot channel (CPICH) is time multiplexed only at certain times to prevent degradation of radio channel resource allocation.

As described above, according to the present invention it is possible for radio resources to be used effectively, interference to be suppressed, and a cell search to be performed at high speed, in a multicarrier CDMA system.

That is to say, on the transmitting side, a scrambling code group identification code for identifying the group of scrambling codes divided into groups beforehand (see, for example, the "cell search procedure" disclosed in 3GPP (3rd Generation Partnership Project) standard "TS25.214 Physical Layer Procedures (FDD)") is placed on a frequency— that is, a scrambling code group identification code is frequency multiplexed in a multicarrier signal—and on the receiving side, the scrambling code group is identified using a scrambling code group identification code contained in a received multicarrier signal, and the scrambling code is identified within the identified scrambling code group, making it possible to shorten the scrambling code identification time by using a secondary synchronization code, and perform a cell search at high speed while making effective use of radio resources and suppressing interference, at the same time suppressing influence on other multiplex signals by setting an appropriate number of subcarriers for frequency multiplexing of the scrambling code group identification code.

If a scrambling code group identification code is coded in the time direction, in particular, time domain spreading can be used for the scrambling code group identification code, and moreover, since frequency multiplexing is performed, both a path diversity effect and a frequency diversity effect can be obtained.

Also, if a scrambling code group identification code is placed on a plurality of frequencies, the probability of scrambling code group identification can be increased.

Furthermore, if a scrambling code group identification code is coded in the frequency direction, frequency domain spreading can be used for the scrambling code group identification code, and moreover, by performing time multiplexing, both a path diversity effect and a frequency diversity effect can be obtained.

Moreover, if a scrambling code group identification code is placed on a plurality of mutually separated frequencies, it is possible to reduce the effect of frequency selective fading during scrambling code group identification.

In addition, if a scrambling code group identification code is an orthogonal code, the likelihood of correlation with other secondary synchronization codes will be minimized, enabling the accuracy of scrambling code group identification to be improved.

Also, if the length of the secondary synchronization code is made shorter than the length of a coding direction unit sequence, and a scrambling code group identification code is placed on a frequency so that the proportion multiplexed with a predetermined other signal (for example, another multiplex signal such as the common pilot channel (CPICH)) is minimized, it is possible to suppress interference with the predetermined other signal.

This application is based on Japanese Patent Application No.2001-375083 filed on Dec. 7, 2001, entire contents of which are expressly incorporated by reference herein.

INDUSTRIAL APPLICABILITY

The present invention is applicable to a mobile station apparatus or base station apparatus in a mobile communication system, etc.

The invention claimed is:

1. A multicarrier transmitting apparatus that performs radio communication by combining a multicarrier modulation method with a code division multiple access method, the multicarrier transmitting apparatus comprising:
   a multicarrier signal forming section that forms a multicarrier signal including a pilot signal and a scrambling code group identification code for identifying a group of scrambling codes divided into groups beforehand; and
   a transmission section that transmits the multicarrier-signal formed in the multicarrier signal forming section, wherein:
   in the multicarrier signal formed in the multicarrier signal forming section, the pilot signal is mapped in a frequency direction at predetermined time intervals and the scrambling code group identification code having a shorter time length than the predetermined time intervals is mapped in a time direction, such that an overlapping proportion of the pilot signal and the scrambling code group identification code is minimized.

2. The multicarrier transmitting apparatus according to claim 1, wherein a time slot defines the predetermined time intervals for mapping the pilot signal.

3. The multicarrier transmitting apparatus according to claim 1, wherein the scrambling code group identification code is placed in a plurality of frequencies.

4. The multicarrier transmitting apparatus according to claim 3, wherein the plurality of frequencies are mutually separated frequencies.

5. The multicarrier transmitting apparatus according to claim 1, wherein the scrambling code group identification code is an orthogonal code.

6. A base station apparatus comprising the multicarrier transmitting apparatus according to claim 1.

7. A multicarrier receiving apparatus that performs radio communication by combining a multicarrier modulation method with a code division multiple access method, the multicarrier receiving apparatus comprising:
   a reception section that receives a multicarrier signal including a pilot signal and a scrambling code group identification code for identifying a group of scrambling codes divided into groups beforehand;
   an extraction section that extracts the scrambling code group identification code from the multicarrier signal received by the reception section;
   a first identification section that identifies a scrambling code group using the scrambling code group identification code extracted by the extraction section; and a second identification section that identifies a scrambling code used by the received multicarrier signal based on the scrambling code group identified by the first identification section, wherein:

in the multicarrier signal received by the reception section, the pilot signal is mapped in a frequency direction at predetermined time intervals and the scrambling code group identification code having a shorter time length than the predetermined time intervals is mapped in a time direction, such that an overlapping proportion of the pilot signal and the scrambling code group identification code is minimized.

8. A base station apparatus comprising the multicarrier receiving apparatus according to claim 7.

9. A multicarrier radio communication method in a multicarrier transmitting apparatus that performs radio communication by combining a multicarrier modulation method with a Code Division Multiple Access method, the multicarrier radio communication method comprising:

a multicarrier signal forming step of forming a multicarrier signal including a pilot signal and a scrambling code group identification code for identifying a group of scrambling codes divided into groups beforehand; and a transmission step of transmitting the formed multicarrier signal, wherein:

in the multicarrier signal formed in the multicarrier signal forming step, the pilot signal is mapped in a frequency direction at predetermined time intervals and the scrambling code group identification code having a shorter time length than the predetermined time intervals is mapped in a time direction, such that an overlapping proportion of the pilot signal and the scrambling code group identification code is minimized.

10. A multicarrier radio communication method in a multicarrier receiving apparatus that performs radio communication by combining a multicarrier modulation method with a Code Division Multiple Access method, the multicarrier radio communication method comprising:

a reception step of receiving a multicarrier signal including a pilot signal and a scrambling code group identification code for identifying a group of scrambling codes divided into groups beforehand;

an extraction step of extracting the scrambling code group identification code from the multicarrier signal received in the reception step;

a first identification step of identifying a scrambling code group using the scrambling code group identification code extracted in the extraction step; and a second identification step of identifying a scrambling code used by the received multicamer signal based on the scrambling code group identified in the first identification step, wherein:

in the multicamer signal received in the reception step, the pilot signal is mapped in a frequency direction at predetermined time intervals and the scrambling code group identification code having a shorter time length than the predetermined time intervals is mapped in a time direction, such that an overlapping proportion of the pilot signal and the scrambling code group identification code is minimized.

* * * * *